United States Patent
Anderson et al.

(10) Patent No.: US 6,223,714 B1
(45) Date of Patent: May 1, 2001

(54) METHOD FOR INCREASING THE SAFETY OF MOTOR-VEHICLE OCCUPANTS IN THE EVENT OF A CRASH

(75) Inventors: Alexander Anderson, Stuttgart; Gunter Karl, Esslingen; Rudolf Klein, Weinstadt; Stephan Kramer, Leutenbach; Peter Lautenschutz, Plochingen; Johannes Leweux, Esslingen; Christoph Lux; Gregor Renner, both of Stuttgart; Klaus Rossler, Altbach; Matthias Schumacher, Schorndorf, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/399,672

(22) Filed: Sep. 21, 1999

(30) Foreign Application Priority Data

Sep. 26, 1998 (DE) .............................. 198 44 215

(51) Int. Cl.$^7$ ........................................... F02B 77/00
(52) U.S. Cl. ............... 123/198 D; 123/529; 123/198 DB
(58) Field of Search ........................ 123/198 D, 198 DB, 123/529; 701/112

(56) References Cited

U.S. PATENT DOCUMENTS

| | | | |
|---|---|---|---|
| 3,994,356 | * 11/1976 | Smitley | 180/282 |
| 3,994,357 | * 11/1976 | Smitley | 180/282 |
| 4,032,091 | * 6/1977 | Reddy | 244/135 R |
| 5,291,578 | * 3/1994 | Kalami | 388/831 |
| 5,441,026 | * 8/1995 | Akimoto | 123/198 D |
| 5,582,806 | * 12/1996 | Skanberg et al. | 422/305 |
| 5,793,121 | * 8/1998 | Burgess | 307/10.1 |
| 5,797,111 | * 8/1998 | Halasz et al. | 701/103 |
| 5,825,098 | * 10/1998 | Darby et al. | 307/10.1 |
| 6,092,500 | * 7/2000 | Frank et al. | 123/198 D |

FOREIGN PATENT DOCUMENTS

| | | |
|---|---|---|
| 3116867A1 | 11/1982 | (DE) . |
| 4440700A1 | 6/1995 | (DE) . |
| 0308467B1 | 12/1993 | (EP) . |
| 0242370B1 | 8/1994 | (EP) . |
| 0494468B1 | 9/1995 | (EP) . |
| 0825056A2 | 6/1997 | (EP) . |

OTHER PUBLICATIONS

Paper entitled: "Combustion And Emissions Characteristics Of Orbital's Combustion Process Applied To Multi–Cylinder Automotive Direct Injected 4–Stroke Engines", Rodney Houston, Geoffrey Cathcart, Orbital Engine Company, Perth, Western Autralia; 98P–136.

* cited by examiner

Primary Examiner—Willis R. Wolfe
Assistant Examiner—Hai Huynh
(74) Attorney, Agent, or Firm—Mark P. Calcaterra

(57) ABSTRACT

Switching off a fuel pump of a fuel supply system for the internal combustion engine with the aid of a signal from a retardation sensor of the airbag in the event of a crash in which the motor vehicle is involved is known.

To further enhance the safety of motor-vehicle occupants, a method is proposed for an internal combustion engine which has at least one fuel injection valve, a fuel supply system for the at least one fuel injection valve, and a sensor for detecting a crash. After the crash has been detected by means of the sensor, the fuel injection valve is brought into an open position, with the result that fuel is discharged from the fuel supply system of the fuel injection valve into a combustion chamber of the internal combustion engine.

The method according to the invention is provided for internal combustion engines with at least one fuel injection valve.

12 Claims, 1 Drawing Sheet

METHOD FOR INCREASING THE SAFETY OF MOTOR-VEHICLE OCCUPANTS IN THE EVENT OF A CRASH

BACKGROUND OF THE INVENTION

The invention takes as its starting point a method for increasing the safety of motor-vehicle occupants in the event of a crash, by reducing fuel pressure and volume in the fuel supply system upon sensing a collision. A method for increasing the safety of motor-vehicle occupants in the event of a crash has already been disclosed (DE 31 16 867 A1). In this method, a fuel pump of a fuel supply system for the internal combustion engine is switched off with the aid of a signal from a retardation sensor of an airbag installed in the motor vehicle if the motor vehicle is involved in a crash. However, there is still fuel in fuel lines of the fuel supply system which, for example, carry fuel via a common pipe to fuel injection valves of the internal combustion engine, and this fuel may ignite in the event of a crash.

SUMMARY OF THE INVENTION

In accordance with the invention, in a motor vehicle having an internal combustion engine which has at least one fuel injection valve, a fuel supply system for the at least one injection valve, and a sensor for detecting a crash, a method for increasing the safety of motor vehicle occupants comprising the steps of detecting a crash by means of a sensor, and opening the at least one fuel injection valve to discharge fuel from a supply system of the fuel injection valve into a combustion chamber of the internal combustion engine.

BRIEF DESCRIPTION OF THE DRAWING

An example embodiment of the invention is illustrated in simplified form in the drawing FIG. 1 and explained in greater detail in the description which follows.

DETAILED DESCRIPTION

Figure 1:
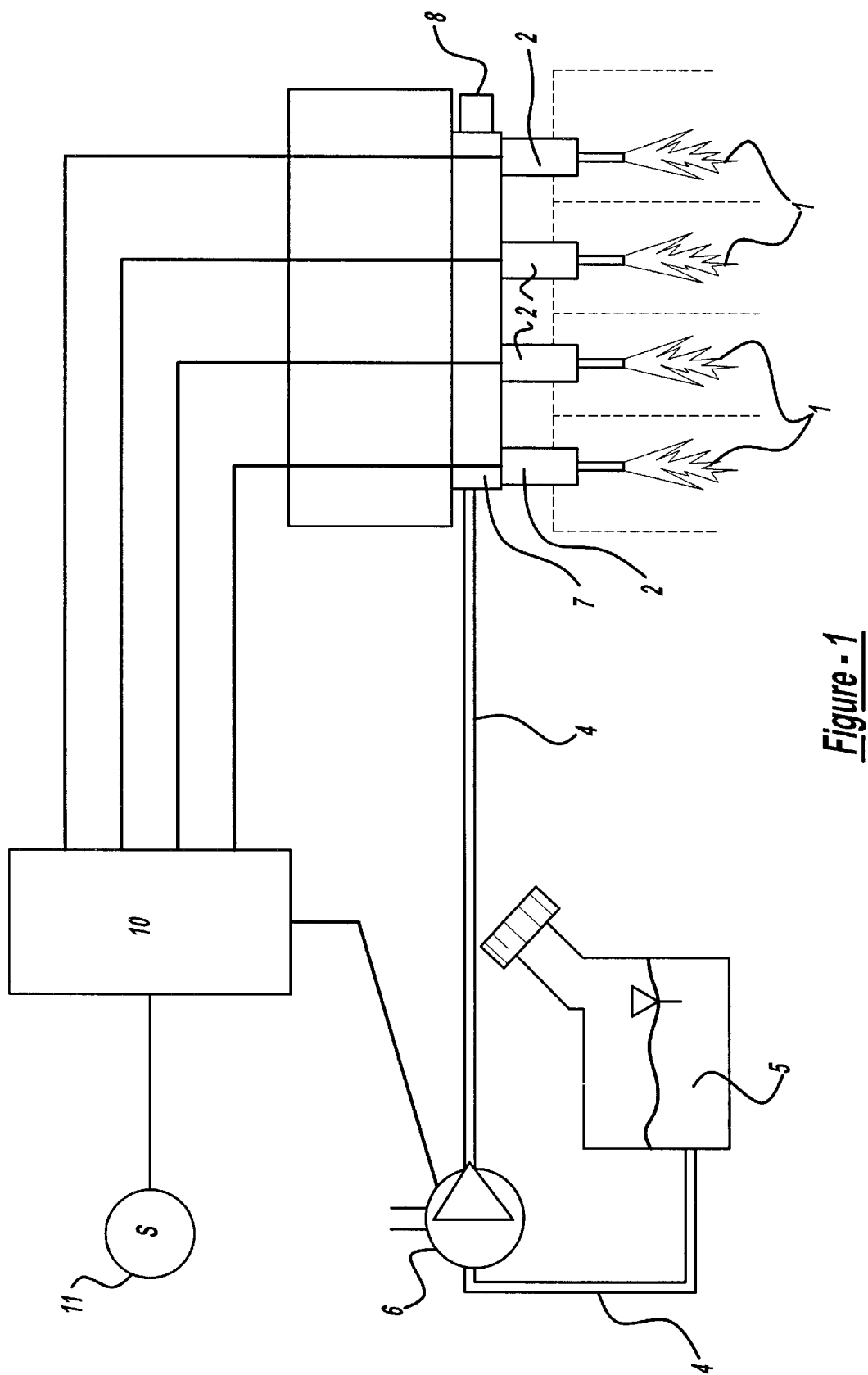

In the case of modern internal combustion engines with applied ignition (Otto engines) or auto-ignition (diesel engines), fuel is injected directly into combustion chambers 1 (indicated by broken lines in FIG. 1 of the internal combustion engine by means of fuel injection valves 2 under relatively high pressure. In the case of Otto engines, more than 5 bar is provided, while, in the case of diesel engines, more than 500 bar is provided to obtain good atomization of the fuel. The fuel injection valves 2 are supplied with fuel by means of a fuel supply system comprising fuel lines 4, a fuel tank 5, a fuel pump 6 and, for example, a common pipe (fuel rail) 7. In the event of an accident (crash), there is the risk that fuel under high pressure will escape from the fuel supply system and ignite at a source of ignition. This risk increases with increasing pressure in the fuel supply system since atomization is better and the emerging quantity of fuel for a leak of the same size increases.

It is therefore necessary to reduce the fuel pressure in the entire fuel supply system as quickly as possible in the event of a crash, for which purpose fuel is removed from the fuel supply system. It is furthermore advantageous to reduce the volume of fuel in the fuel supply system in order to keep the quantity of fuel that can escape in the event of damage to the fuel supply system as small as possible.

The invention proposes to open the fuel injection valves 2 of the internal combustion engine in the event of an accident (crash) to allow as much fuel as possible to pass from the fuel supply system into the "safe" combustion chamber 1 of the internal combustion engine. This also involves a reduction in the pressure in the fuel supply system. The fuel introduced into the combustion chamber 1 is relatively well protected in the combustion chamber 1 from external influences, and ignition of fuel in the event of a crash can therefore be said to be very unlikely. Another advantage of opening the fuel injection valves 2 in the event of a crash is that, apart from reducing the pressure, it also reduces the quantity of fuel in the fuel supply system, especially in the common pipe (fuel rail) 8 jointly supplying the fuel injection valves 2 with fuel and in the fuel lines 4. After a predeterminable opening time has expired, the fuel injection valves 2 are switched back into a closed position. The opening time should be chosen as a function of the specific embodiment of the fuel supply system and the situation as regards installation in the motor vehicle and on the internal combustion engine. The opening time should furthermore be appropriately adapted to the crash behaviour of the motor vehicle. In addition to opening the fuel injection valves 4 in the event of a crash, it is advantageous simultaneously to open any pressure control valve 7 on the common pipe 7 as quickly as possible, this valve reducing the pressure by discharging fuel into a low-pressure zone of the fuel supply system, e.g. the fuel tank 5.

After a crash has been detected, further measures can be taken in addition in order to stop fuel delivery to the fuel supply system. Among these measures is the switching off of the fuel pump 6 of the fuel supply system. Another is to switch off pump elements in the case of switchable mechanically driven fuel pumps. Where electrically driven fuel pumps have the facility to do so, it is also possible for them to be braked electrically. If the design of the fuel pump 6 or a fuel delivery system allows, it is also possible for fuel to be fed back into the fuel tank 5 of the internal combustion engine.

The fuel injection valves 2 can be controlled by means of an electronic control unit 10, of which there is usually one in a motor vehicle. For crash detection, the electronic control unit 10 evaluates signals from a crash sensor 11. The crash sensor 11 can be an airbag retardation sensor already installed in the motor vehicle. It is also possible to use signals from a vehicle tilt-angle sensor, a yaw-rate sensor of a vehicle-dynamics system or other suitable sensors. The output signals from these sensors can either be processed directly or by a downstream evaluation logic device in the control unit 10. If the motor vehicle does not have a suitable sensor, an appropriate sensor must be installed. If the evaluation of a signal from the crash sensor 11 by the electronic control unit 11 shows that there is a crash, the fuel injection valves 2 are immediately opened by activation by means of the electronic control unit 10. This allows fuel to flow into the "safe" combustion chamber 1, thereby reducing the amount of fuel in the fuel supply system, particularly in the common pipe 7. Simultaneously with the discharge of the fuel injection valves 2, the fuel pump 6 of the fuel supply system can be switched off by the electronic control unit 10.

The safety concept disclosed can also be employed in the case of an air-assisted injection system which has mixture injection valves. Mixture injection valves of this kind have a conventional injection valve which discharges fuel into a mixing chamber of the mixture injection valve and ejects it directly into the combustion chamber in the form of a fuel/air mixture via a spray valve. The construction and action of mixture injection valves of this kind is sufficiently well known to the person skilled in the art from the SAE Paper 98P-136, 1988, Rodney Houston, Geoffrey Cathcart, Orbital Engine Company, Perth, Western Australia, "Combustion and Emissions Characteristics of Orbital's Combustion Process Applied to Multi-Cylinder Automotive Direct Injected 4-Stroke Engines", pages 1–12, or from publications EP 0 242 370 B1, EP 0 308 467 B1 and EP 0 494 468 B1. In the event of a crash, the mixture injection valves are likewise opened, both the conventional injection valve and the spray valve of the mixture injection valve being opened, thereby allowing fuel to flow into the combustion chamber 1.

However, it is also possible to transfer this safety concept to fuel injection valves for applied-ignition internal combustion engines with conventional intake-pipe injection.

What is claimed is:

1. Method for increasing the safety of motor-vehicle occupants in the event of a crash, the said motor vehicle having an internal combustion engine which has at least one fuel injection valve, a fuel supply system for the at least one fuel injection valve, and a sensor for detecting a crash, the method comprising the steps of, detecting a crash by means of the sensor, and opening the fuel injection valve, with the result that fuel is discharged from the fuel supply system of the fuel injection valve into a combustion chamber of the internal combustion engine.

2. Method according to claim 1, further comprising, after a certain opening time, the at least one fuel injection valve (2) is brought back into its closed position.

3. Method according to claim 1, wherein fuel is discharged directly into the combustion chamber by the fuel injection valves.

4. Method according to claim 1, wherein the sensor is a retardation sensor of an airbag.

5. Method according to claim 1, wherein signals from the sensor are fed for evaluation to an electronic control unit which, after detecting a crash, moves the at least one fuel injection valve into an open position.

6. Method according to claim 5, further comprising, in the event of a crash, a fuel pump of the fuel supply system is switched off by means of the control unit.

7. Method according to claim 1, wherein the internal combustion engine is an applied-ignition internal combustion engine.

8. Method according to claim 7, wherein the at least one fuel injection valve is a mixture injection valve of an air-assisted injection system.

9. Method according to claim 7, wherein the at least one fuel injection valve is a valve for conventional intake-pipe injection to the internal combustion engine.

10. Method according to claim 1, wherein the internal combustion engine is an auto-ignition internal combustion engine.

11. Method according to claim 1, wherein the sensor comprises a vehicle tilt-angle sensor.

12. Method according to claim 1, wherein the sensor comprises a yaw-rate sensor of a vehicle dynamics systems.

* * * * *